Patented Aug. 24, 1937

2,090,629

UNITED STATES PATENT OFFICE 2,090,629

RUBBER COMPOSITION AND METHOD OF MAKING THE SAME

Glen S. Hiers and John E. Conrad, Bala-Cynwyd, Pa., assignors to Collins & Aikman Corporation, Philadelphia, Pa., a corporation of Delaware No Drawing. Original application November 2, 1933, Serial No. 696,387. Divided and this application July 31, 1934, Serial No. 737,769

15 Claims. (Cl. 18—53)

Our invention is an improved rubber product and a method of dispersing certain ingredients thereof to form a substantially stable liquid mix, by which an improved distribution of vulcanizers, accelerators, plasticizers, softeners and antioxidants in a rubber compound may be effected without coagulation of the rubber globules in or from an aqueous dispersion thereof. Our invention, in its preferred form, also permits the elimination or minimizing of surface tackiness of the rubber prior to vulcanization.

Our improvements are particularly applicable to the production of pile fabrics having pile tufts secured to a ground by the impregnation of such ground with a liquid binding material solidifiable into a flexible bed or layer within the ground without obliteration of the textile feel resulting from the projection of the tips of pile bights outward from the general level of such bed, as set forth in our application Serial No. 696,387, whereof the present application is a division. The binding material may adhere to some of the individual tips as minute discrete particles or areas in which uniform dissemination of vulcanizing and other compounding ingredients is very desirable. Moreover, when a "bloom" of waxy anti-tack material is formed on the rubber, the individual areas of rubber so protected are too small to cause strong adhesion of fabric laminations together or to other objects after the rubber is coagulated or dehydrated but before vulcanization thereof, when rubber is usually "tacky".

By our improvements we incorporate in or emulsify with an aqueous dispersion of rubber a non-aqueous and water immiscible vehicle which is not a solvent for rubber but which contains a vulcanizer in solution or colloidal dispersion. The incorporation of such vehicle and vulcanizer does not coagulate or precipitate the rubber globules dispersed in the aqueous dispersion. Such vehicle is a solid or semi-solid at room temperatures and liquefiable by heat and preferably comprises a waxy material in quantity sufficient when dispersed to permit the retention of the liquidity of the mix, but to render the waxy material incompatible with the rubber when coagulated so that it forms a waxy anti-tack "bloom" on the surface of rubber subsequently coagulated from the mix.

Such anti-tack materials are utilized by us as a non-aqueous and water immiscible vehicle forming a stable dispersed phase for thoroughly dispensing a compounding ingredient or ingredients, viz., vulcanizers, plasticizers, softeners and accelerators, and, if desired, also anti-oxidants and/or fillers, in a continuous phase formed by the water of an aqueous dispersion of rubber whose rubber globules are not coagulated by such compounding ingredients or the dispersing thereof. The non-aqueous vehicle used by us as a solvent of or carrier for the compounding ingredients, may be emulsified directly with the water of the aqueous dispersion of rubber, without coagulating the rubber globules therein, or may be emulsified with water and added as an emulsion to the aqueous dispersion of rubber without coagulating the rubber globules therein.

The dispersing vehicle used by us preferably comprises a heat-liquefiable waxy material miscible, in its liquefied state, with the vulcanizing, accelerating, anti-oxidizing or other compounding ingredients, which are also preferably liquefiable by heat. The vehicle apparently forms a true solution of the vulcanizers, plasticizers, softeners, accelerators and anti-oxidants and other compounding ingredients. A water immiscible, non-aqueous solid or semi-solid solvent for the waxy material, for the vulcanizer, for the accelerator and for the anti-oxidant, etc., may be mixed therewith to facilitate the thorough dissemination and admixture of the substances. Whether true solutions or colloidal suspensions result from such admixtures is at present undeterminable with certainty and we have, therefore, referred to the step of disseminating such substances, without coagulating rubber globules, as "dispersing" such substances. So also, in using the term aqueous dispersions of rubber, we intend to comprehend natural latex, or water suspensions of rubber in which natural globules of latex have been coalesced into minute particles, or coagulated rubber which has been artificially dispersed in water.

The mixture formed from the heat-liquefiable ingredients, and each of such ingredients, preferably has a solidification point or temperature below, or not materially above, the boiling point of the water or of the aqueous dispersion of rubber in which they are to be disseminated.

The mixture of ingredients while heated to liequefaction is disseminated, as, for instance, by agitation, as the substantially stable dispersed phase of an emulsion having water as its continuous phase. Such water may be the water of an aqueous dispersion of rubber having at the time a temperature above the solidification point of the mixture containing the vulcanizer, accelerator, anti-oxidants, softeners, plasticizers or anti-tack material, or any of them. On cooling, the dispersed ingredients remain disseminated uniformly throughout the smooth, substantially non-coagulated aqueous rubber liquid dispersion, if dispersed directly therein, and any settling or separation resulting from standing are readily disseminated by agitation. If the mixture is emulsified with water having little or no rubber therein, the emulsion readily disperses in the water of an aqueous dispersion of rubber and the non-aqueous materials form a uniformly dispersed phase in the water of the rubber dispersion without coagulating the rubber globules therein.

When such product is applied to a pile or tufted fabric, it penetrates or permeates the pores and interstices thereof and securely binds the fibres together without obliterating the textile feel or roughness resulting from the projection of the tips of pile bights or the interlacing of the ground yarns. And when applied to other suitable porous products, it permeates the same and forms a layer having an equal diffusion of vulcanizers and other compounding ingredients and free from tackiness before, as well as after, vulcanization.

On coagulation or dehydration of the rubber globules by evaporation of the water from the mix or other suitable coagulating treatment independent of the dispersing of the compounding ingredients, the incompatible waxy material comes to the surface as a lubricous anti-tack "bloom" and, on the application of vulcanizing heat, the "blooming" of the waxy material is accentuated and the vulcanizer and accelerator rapidly and uniformly combine with the rubber globules to form a uniformly vulcanized layer or bed. Preferably, the pile is dyed after vulcanization, but the presence of the waxy anti-tack material permits dyeing before vulcanization, if desired; the heat of the dye-bath further developing the "bloom" of the waxy material.

A wide variety of vehicles and of ingredients dispersed therein are suitable for the practice of our invention and several miscible vehicles may be combined so as to secure maximum solubility of the several vulcanizing, accelerating, plasticizing, softening or anti-oxidizing ingredients. For instance, candelilla wax is a desirable inexpensive anti-tack and emulsifying agent which is a solvent for sulphur to a limited degree, but a much greater percentage of sulphur is soluble therein if a proportion of the more costly halowax (polychlorinated naphthalene) is also used therewith.

Among the waxy, waxlike or resinous vehicles which are liquefiable by heat, solidifiable in a suitable temperature range of, say, 60 degrees to 100 degrees centigrade, have a specific gravity below that of rubber or aqueous dispersions of rubber, may be dispersed in aqueous rubber without coagulating the rubber globules thereof, and are solvents or dispersing vehicles for compounding ingredients such as vulcanizers, accelerators, anti-oxidants, etc., are candelilla, Montan and carnauba waxes, paraffin, chlorinated paraffin, ceresine, beeswax, glyceryl-stearate, cumar, stearic acid, ozokerite, China wax, polychlorinated paraffin or naphthalene (such as halowax) and spermaceti.

Among the auxiliary solvents or blending agents which we have found useful in augmenting the solubility of the vehicles and compounding ingredients and the emulsification of such mixtures without coagulating dispersed rubber globules are aromatic hydrocarbons or chlorinated hydrocarbons such as diphenyl, chlorinated diphenyl, paradichlorbenzene and naphthalene.

As vulcanizers and accelerators, we have satisfactorily used sulphur, mercaptobenzothiazole (commonly known as captax), tetramethylthiuramdisulfide (commonly known as tuads), zinc dimethyldithiocarbamate (commonly known as zimate), or piperidinepentamethylenedithiocarbamate (commonly known as 552).

As anti-oxidants we have satisfactorily used phenylbetanaphthylamine (commonly known as neozone D) or phenylalphanaphthylamine (commonly known as neozone A).

Emulsification of the heat-liquefied vehicle containing the heat-liquefied compounding ingredients may be facilitated or augmented by the use of soaps or soap forming materials. For instance, we may form an emulsifying soap by using in the heat-liquefied mixture a waxy material containing an organic acid, for instance stearic acid, which will react with an alkaline material, for instance, triethanolamine, contained in or added to the water or aqueous dispersion of rubber in which the heat-liquefied mixture is dispersed.

In our experience so far, the most satisfactory sulphur solvents are chlorinated paraffins and naphthenes marketed commercially under the name halowaxes, such as halowax 1012; chlorinated diphenyls marketed commercially under the name arachlors, such as arachlors 4465 or 1269; and diphenyl. These solvents are also very satisfactory solvents for the other compounding ingredients and waxy vehicles therefor above named.

As an illustration of the practice of our invention there may be melted together at a temperature of about 85 degrees centigrade—

(a) 5 grams of sulphur.
(b) 5 grams of mercaptobenzothiazole, or of tetramethylthiuramdisulfide, or of zinc dimethyldithiocarbamate, or 2½ grams of piperidinepentamethylenedithiocarbamate.
(c) 5 grams of phenylbetanaphthylamine or phenylalphanaphthylamine.
(d) 15 grams of candelilla wax.
(e) 15 grams of polychlorinated naphthalene melting below 100 degrees C. (halowax) or 15 grams chlorinated diphenyl (arachlor); or 15 grams of paradichlorbenzene; or 15 grams of naphthalene; or 15 grams of diphenyl.
(f) 5 grams of stearic acid.

All of the foregoing substances are miscible and liquefiable at 100 degrees centigrade when mixed together, except zimate, which requires the mixture to be heated to 100°–120° centigrade to produce miscibility. The mixture will remain fluid when cooled to a temperature below the boiling point of water.

When these ingredients are thoroughly liquefied and commingled so that the compounding ingredients are uniformly dispersed in the vehicle, the mixture is gradually mixed and agitated with 150 grams of water containing 2 grams of triethanolamine and having a temperature of say 90°–100° C. The resulting emulsion is smooth and stable and quite fluid at room temperatures, say 15°–30° C. The emulsion (202 grams) may then or thereafter be stirred, (hot or cold) into about 1315 grams of 38% stabilized natural latex (hot or cold). The mixture retains its liquidity and contains about 1% of sulphur, about 1% of accelerator, about 1% of anti-oxidant, and about 6% waxy anti-tack on the basis of rubber solids, and gives a rubber composition having total solids approximating 36%.

Instead of emulsifying the vehicle and compounding ingredients with rubber-free water, they may be emulsified directly in the water of an aqueous dispersion of rubber heated to a temperature above the solidification point of the mixture of vehicle and compounding ingredients. For example, 1 gram of sulphur, 1 gram of mercaptobenzothiazole, 1 gram phenylbetanaphthylamine, 3 grams candelilla wax, 3 grams polychlorinated naphthalene (halowax), and 1 gram of stearic acid may be liquefied together by heat (say 100° C.) and stirred until the compounding ingredients are thoroughly dispersed in the waxy vehicle. While still hot, the mixture may be gently stirred into 263 grams of 38% stabilized natural latex containing 0.4 grams of triethanolamine. The resulting emulsion is smooth and stable liquid and contains approximately 42% total solids.

Many accelerators work best in the presence of a zinc salt or zinc oxide and in some accelerators zinc salt is included directly. Where it is desirable to add zinc oxide, this may be added in the form of a fine colloid or paste which may be mechanically dispersed and held in suspension in the mixture without destroying the liquidity of the rubber composition.

Having described our invention, we claim:

1. A rubber product comprising a stable emulsion having the water of an aqueous dispersion of rubber as its continuous phase and a waxy non-aqueous liquefiable vehicle containing a vulcanizer soluble in such vehicle as its dispersed phase said vehicle being a non-solvent of rubber and a solvent for the vulcanizer.

2. A rubber product comprising a substantially stable liquid emulsion having the water of an aqueous dispersion of rubber as its continuous phase and a waxy water immiscible vehicle comprising dispersed particles of a heat-liquefiable substance containing a vulcanizer soluble in such substance as its dispersed phase.

3. A rubber product comprising a substantially stable liquid emulsion having the water of an aqueous dispersion of rubber as its continuous phase and a waxy non-aqueous vehicle comprising dispersed particles of a heat liquefiable substance containing in solution a vulcanizer and a heat liquefiable accelerator as a dispersed phase, and also having uncoagulated rubber globules as a dispersed phase.

4. A rubber product comprising an emulsion having the water of an aqueous dispersion of rubber as its continuous phase and a waxy non-aqueous solution comprising dispersed particles of a waxy material containing a dispersion of a vulcanizer, an accelerator and an anti-oxidant as a dispersed phase, the rubber of said aqueous dispersion of rubber being also dispersed.

5. A rubber product comprising an emulsion having the water of an aqueous dispersion of rubber as its continuous phase and a waxy anti-tack material as a dispersed phase, said anti-tack material having a vulcanizer dispersed therein, and the rubber of said dispersion of rubber being uncoagulated by said dispersed phase.

6. A rubber product comprising an emulsion having the water of an aqueous dispersion of rubber as its continuous phase and a waxy anti-tack material as its dispersed phase, said anti-tack material containing a vulcanizer, an accelerator and an anti-oxidant, the rubber of said dispersion of rubber being uncoagulated by said dispersed phase.

7. A rubber product comprising an emulsion having the water of an aqueous dispersion of rubber as its continuous phase and a disperse phase consisting of a "bloom-forming" material, a vulcanizer, an accelerator, an anti-oxidant and a solvent for said "bloom-forming" material, vulcanizer, accelerator and anti-oxidant.

8. In the art of dispersing ingredients in rubber products, the steps which comprise dispersing a vulcanizer in a non-aqueous heat liquefiable vehicle therefor and dispersing such vehicle and vulcanizer as a disperse phase in the water of an aqueous dispersion of rubber without coagulating the rubber thereof.

9. In the art of dispersing ingredients in rubber products, the steps which comprise dispersing an anti-oxidant, a vulcanizer and an accelerator in a waxy vehicle and dispersing such vehicle as a dispersed phase in the water of an aqueous dispersion of rubber without coagulating the rubber thereof.

10. In the art of dispersing ingredients in rubber products, the steps which comprise liquefying by heat a normally solid vehicle and a vulcanizer, and dispersing the liquefied substances as a dispersed phase in a continuous phase comprising the water of an aqueous dispersion of rubber without coagulating the rubber thereof.

11. In the art of dispersing ingredients in rubber products, the steps which comprise dissolving a vulcanizer in a liquefied waxy vehicle, and dispersing such solution as a dispersed phase in the water of an aqueous dispersion of rubber in quantity insufficient to effect coagulation of the rubber.

12. In the art of dispersing ingredients in rubber products, the steps which comprise liquefying a vulcanizer and a normally solid solvent therefor, and dispersing the liquefied substance as a dispersed phase in the water of an aqueous dispersion of rubber in quantity insufficient to coagulate the rubber content thereof.

13. In the art of dispersing ingredients in rubber products, the steps which comprise liquefying by heat a waxy substance, mixing a vulcanizer with such substance, dispersing such substance and vulcanizer in a solvent therefor, and dispersing such solution as a substantially stable dispersed phase in water of an aqueous dispersion of rubber.

14. In the art of making rubber products, the steps which comprise dispersing a vulcanizer in a waxy anti-tack material, dispersing such mixture as a dispersed phase in the water of an aqueous dispersion of rubber, coagulating the rubber and the ingredients of said dispersed phase in the form of a layer having a surface divided into minute areas and subjecting said layer to a heat sufficient to cause the "blooming" of said waxy material and the vulcanization of said rubber.

15. In the art of making rubber products, the steps which comprise dispersing an anti-oxidant, a vulcanizer and an accelerator in a waxy vehicle, dispersing such vehicle as a dispersed phase in the water of an aqueous dispersion of rubber without coagulating the rubber thereof, applying the liquid mixture to a porous base in the form of a film and coagulating the rubber in situ in the porous base.

GLEN S. HIERS.
JOHN E. CONRAD.